United States Patent Office 3,248,401
Patented Apr. 26, 1966

3,248,401
3-DIETHYLAMINOETHOXYBENZOYL-BENZOFURANS
Rene Tondeur and Fernand Binon, Brussels, Belgium, assignors to Societe Belge de l'Azate et des Produits Chimiques du Marly, S.A., Liege, Belgium
No Drawing. Filed Nov. 14, 1962, Ser. No. 237,750
Claims priority, application Germany, Nov. 24, 1961, 76,824
11 Claims. (Cl. 260—346.2)

The invention relates to novel organic compounds having therapeutic properties and more specifically pertains to substituted benzofurans having the following general formula:

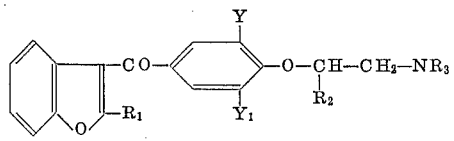

and their non-toxic salts in which $R_1$ is an alkyl group containing 1 to 6 carbon atoms, $R_2$ is selected from the group consisting of hydrogen and methyl, $NR_3$ is a radical selected from the group consisting of a dimethylamino, diethylamino, dipropylamino, piperidino, pyrrolidino and morpholino and Y and $Y_1$, which are identical, are selected from the group consisting of hydrogen, iodine and bromine.

The benzofurans as well as their above-mentioned non-toxic salts have therapeutic properties which are, in particular, of benefit to the vascular system and for the systems depending thereon. They are produced from benzofurans having the formula:

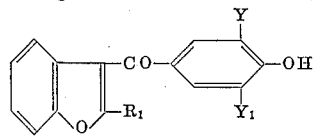

in which $R_1$, Y and $Y_1$ are as above defined. The latter are reacted in the form of an alkaline salt, in a solvent immiscible with water, with an N-disubstituted alkyl-amine-$\beta$-halide having the following formula:

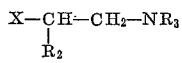

in which $R_2$ and $NR_3$ are as above defined and X is a halogen atom. Then the basic ether is separated from the organic solution in which it has been formed and, if desired, is converted into a non-toxic salt.

The different process stages which constitute the general process described above may, for example, be described in detail as follows:

The starting compound, corresponding to Formula I above, is dissolved in a solvent immiscible with water, preferably ethyl carbonate, toluene or benzene.

The alkaline salt of the phenolic benzofuran is formed by adding to the phenol solution an alkaline alkoxide of an alcohol having a lower boiling point than that of the solvent used to dissolve the phenolic benzofuran, thus making it possible to distill off all the alcohol later on.

After distilling off the alcohol and cooling, an N-substituted alkylamine-$\beta$-halide of Formula II is introduced, after having been previously dissolved in a solvent immiscible in water, preferably in the above-mentioned compounds. After the addition has been effected, progressive heating is carried out preferably for a period of approximately 2 to 5 hours and preferably at a temperature of approximately 60° C. to 100° C. After cooling, the product is extracted as a salt by stirring with a diluted inorganic acid. The acid solutions are rendered strongly alkaline with a concentrated alkaline hydroxide solution and are extracted several times, preferably with a readily volatile solvent as, for instance, petroleum ether, benzene, toluene or ether. The organic basic solution is dried, over anhydrous potassium carbonate, for instance, and then filtered. If the basic ether is to be obtained in a free state it is sufficient to distill off the solvent. If it is desired to produce a non-toxic salt, the filtrate should finally be treated with the corresponding acid. In certain solvents the salt crystallizes directly. If as sometimes happens, the salt separates as a syrup, the super-natent liquid is decanted off. The residue is then crystallized in a suitable solvent and the salt which crystallizes out is centrifuged and dried.

By a modification in the process, it is possible to produce the non-toxic salt when carrying out the etherification of the phenolic benzofuran in benzene or toluene without extracting the basic ether. In this case it is sufficient to remove the alkaline halide and then to precipitate the non-toxic salt of the basic ether by treating the reaction solution with the appropriate acid.

The thus described general process is explained in greater detail in the following examples which, however, should not be construed as limiting the scope of the invention:

EXAMPLE 1

(A) *2-ethyl-3-(4-$\beta$-N-diethylaminoethoxy-benzoyl) benzofuran and its hydrochloride*

97 g. of 2-ethyl-3-(4-hydroxy-benzoyl) benzofuran were dissolved in 500 cc. of dry toluene by heating to 60° C. and 8.4 g. of sodium in the form of sodium methoxide in 200 cc. of methanol were added to the solution.

All of the methanol introduced was distilled off by heating until the vapours attained a temperature of approximately 100° C.

Then the suspension of the sodium salt of the phenol was cooled to a temperature of about 50° C.

$\beta$-diethylaminoethylchloride, which had been obtained from 76 g. of the hydrochloride and was dissolved in toluene was poured into the solution drop by drop, while continually stirring, and the mixture was heated to a temperature of approximately 90° C. which was maintained for approximately 2 hours. The mixture was cooled and allowed to stand overnight during which time the sodium chloride settled down.

The toluene solution containing diethylaminoethylether was extracted with increasingly diluted aqueous hydrochloride acid solutions while stirring. Extraction was continued until the alkalized solution produced no further precipitate.

The combined aqueous solutions were washed with ether and then made strongly alkaline with aqueous sodium hydroxide. Extraction with ether was carried out three times. The organic layers were washed with water and then dried over anhydrous potassium carbonate.

In order to produce the hydrochloride, the carbonate was filtered off and then the hydrochloride was precipitated from the ether solution with an ethereal hydrochloric acid solution.

After the solution had been allowed to stand for a few hours, decantation was carried out and the syrupy hydrochloride residue was taken up in 500 cc. of boiling ethyl acetate.

The salt crystallized out by cooling. The substance was allowed to stand overnight at 0° C., and centrifuged, washed with ethyl acetate and then with ether and dried. Thus, 110 g. of 2-ethyl-3-(4-$\beta$-N-diethyl-aminoethoxy-benzoyl) benzofuran hydrochloride were obtained.

M.P.=114° C.

A second fraction can be obtained from the mother liquor.

$C_{23}H_{28}O_3NCl$ calculated: N, 3.5%; Cl, 8.8%. Found: N, 3.49%; Cl, 8.81%.

If the reaction is carried out in ethyl carbonate instead of in toluene, a total yield of 82 g. is obtained from 130 g. of 2-ethyl-3-(4-hydroxy-benzoyl) benzofuran.

(B) *2-ethyl-3-(4-β-N-dimethyl-aminoethoxy-benzoyl) benzofuran and its hydrochloride*

As in the process described in Example 1A, 2-ethyl-3-(4-β-N-dimethylaminoethoxy-benzoyl) benzofuran was obtained by reaction of 2-ethyl-3-(4-hydroxy-benzoyl) benzofuran with β-dimethylaminoethyl-chloride in ethyl carbonate; the very hygroscopic hydrochloride of the substance obtained was crystallized from a mixture of ethyl acetate and ether.

$C_{21}H_{24}O_3NCl$ calculated: C, 67.3%; H, 6.47%; N, 3.74%; Cl, 9.5%. Found: C, 67.5%; H, 6.62%; N, 4.09%; Cl, 9.8%.

(C) *2-ethyl-3-(4-β-N-piperidinoethoxy-benzoyl) benzofuran and its hydrochloride*

As in the process described in Example 1A, 2-ethyl-3-(4 - β-N - piperidinoethoxy - benzoyl) benzofuran was obtained by reaction of 2-ethyl-3-(4-hydroxy-benzoyl) benzofuran with β-piperidinoethylchloride in ethyl carbonate; the hydrochloride of the substance obtained melts at 122° C. after recrystallization from ethyl acetate.

$C_{24}H_{28}O_3NCl$ calculated: C, 69.46%; H, 6.80%; Cl, 8.58%. Found: C, 69.10%; H, 7.05%; Cl, 8.33%.

(D) *2-ethyl-3-(4-β-N-morpholinoethoxy-benzoyl) benzofuran and its hydrochloride*

As in the process described in Example 1A, 2-ethyl-3-(4-β-N-morpholinoethoxy-benzoyl) benzofuran was obtained by reaction of 2-ethyl-3-(4-hydroxy-benzoyl) benzofuran with β-morpholinoethylchloride in ethyl carbonate; the hydrochloride of the substance obtained melts at 198° C.–200° C. after recrystallization from a methanol-acetone mixture.

$C_{23}H_{26}O_4NCl$ calculated: C, 66.4%; H, 6.30%; N, 3.36%; Cl, 8.55%. Found: C, 66.23%; H, 6.49%; N, 3.37%; Cl, 8.51%.

(E) *2-neohexyl-3-(4-β-N-diethylaminoethoxy-benzoyl) benzofuran and its hydrochloride*

As in the process described in Example 1A, 2-neohexyl-3-(4-β-N-diethylamino-ethoxy-benzoyl) benzofuran was obtained by reaction of 2-neohexyl-3-(4-hydroxy-benzoyl)benzofuran with β-diethylaminoethyl-chloride in ethyl carbonate; the hydrochloride of the substance obtained melts at 172° C. after recrystallization from an ethyl acetate-ether mixture.

$C_{27}H_{36}O_3NCl$ calculated: C, 70.5%; H, 7.91%; N, 3.02%; Cl, 7.72%. Found: C, 70.4%; H, 7.86%; N, 3.10%; Cl, 7.86%.

(F) *2-ethyl-3-(4-β-N-pyrrolidinoethoxy-benzoyl) benzofuran and its hydrochloride*

As in the process described in Example 1A, 2-ethyl-3-(4-β-N-pyrrolidinoethoxy-benzoyl) benzofuran was obtained by reaction of 2-ethyl-3-(4-hydroxy-benzoyl) benzofuran with β-pyrrolidinoethylbromide in ethyl carbonate; the hydrochloride of the substance obtained melts at 174° C. after recrystallization from a methanol-ethyl-acetate mixture.

$C_{23}H_{26}O_3NCl$ calculated: C, 69.08%; H, 6.55%; N, 3.51%; Cl, 8.90%. Found: C, 69.38%; H, 6.92%; N, 3.55%; Cl, 8.75%.

(G) *2-n-butyl-3-(4-β-N-diethylaminoethoxy-benzoyl) benzofuran and its hydrochloride*

As in the process described in Example 1A, 2-n-butyl-3-(4-β-N-diethylaminoethoxy-benzoyl) benzofuran was obtained by reaction of 2-n-butyl-3-(4-hydroxy-benzoyl) benzofuran with β-diethylaminoethyl-chloride in ethyl carbonate; the hydrochloride of the substance obtained melts at 102° C. after recrystallization from an ethyl acetate-ether mixture.

$C_{25}H_{32}O_3NCl$ calculated: C, 69.7%; H, 7.44%; N, 3.25%; Cl, 8.27%. Found: C, 68.3%; H, 8.02%; N, 3.38%; Cl, 8.11%.

EXAMPLE II (A) *2-n-butyl-3-(3.5-diiodo-4-β-N-diethylaminoethoxy-benzoyl) benzofuran and its hydrochloride*

135 g. of 2-n-butyl-3-(3.5-diiodo-4-hydroxy-benzoyl) benzofuran dissolved in 600 cc. of ethyl carbonate were treated with 5.7 g. of sodium as in Example I.

The chlorinated amine produced from 51.6 g. of the hydrochloride in ethyl carbonate was introduced into a suspension of the sodium salt. After the reactions and isolation stages described in Example 1A were carried out, the syrupy hydrochloride precipitate finally obtained was taken up in boiling acetone. 130 g. of 2-n-butyl-3-(3.5-diiodo-4-β-N-diethylaminoethoxy-benzoyl) benzofuran hydrochloride in the form of a crystalline powder which melts at 156° C. were obtained.

If, after alkalization of the aqueous solutions containing the basic ether, extraction is carried out with benzene instead of with ether (as in Example 1A), the hydrochloride in crystalline form can be obtained directly after drying the benzene solution of the basic ether by treating this benzene solution with gaseous hydrogen chloride or with a benzene solution of the latter. In the same way, if the etherification is carried out in benzene or toluene instead of in ethyl carbonate, cooling can be effected after the reaction with the β-diethylaminoethylchloride, the NaCl formed during the reaction can be filtered off in the presence of activated charcoal and the hydrochloride can be directly precipitated in crystalline form by introducing gaseous hydrogen chloride just until an acid reaction is obtained.

$C_{25}H_{30}I_2O_3NCl$ calculated: C, 44.04%; H, 4.44%; N, 2.06%; Cl. 5.20%; I, 37.25%. Found: C, 43.71%; H, 4.39%; N, 2.07%; Cl, 5.26%; I, 36.95%.

(B) *2-ethyl-3-(3.5-diiodo-4-β-N-diethylaminoethoxy-benzoyl) benzofuran and its hydrochloride, nitrate and its acid sulphate*

By the same process, the corresponding β-diethylaminoethoxy derivative was obtained from 2-ethyl-3-(3.5-diiodo-4-hydroxy-benzoyl) benzofuran; after recrystallization from acetone the hydrochloride of the substance melted at 152° C.

$C_{23}H_{26}O_3NI_2Cl$ calculated: C, 42.26%; H, 4.11%; N, 2.14%; Cl, 5.43%. Found: C, 42.34%; H, 4.37%; N, 2.33%; Cl, 5.79%.

The nitrate, which was obtained by precipitating the salt from the base with the aid of an ethereal nitric acid solution, melted at 129° C. after recrystallization from a mixture of acetone and ethyl acetate.

$C_{23}H_{26}O_6I_2N_2$ calculated: C, 40.58%; H, 3.82%; N, 4.12%. Found: C, 40.93%; H, 4.00%; N, 4.14%.

The acid sulphate, which was produced by precipitation with the aid of an ethereal sulphuric acid solution, melted at 154° C. after recrystallization from a mixture of acetone and ethyl acetate.

$C_{23}H_{27}O_7I_2NS$ calculated: C, 38.65%; H, 3.81%; N, 1.96%. Found: C, 38.94%; H, 3.88%; N, 1.92%.

(C) *2-n-propyl-3-(3.5-diiodo-4-β-N-diethylaminoethoxy-benzoyl) benzofuran and its hydrochloride*

The corresponding β-diethylaminoethoxy derivative was obtained from 2-n-propyl-3-(3.5-diiodo-4-hydroxy-benzoyl) benzofuran; the hydrochloride of the substance obtained melted at 166° C. after recrystallization from a methanol-acetone mixture.

$C_{24}H_{28}O_3I_2NCl$ calculated: C, 43.2%; H, 4.22%; N, 2.10%; Cl, 5.32%. Found: C, 43.24%; H, 4.39%; N, 2.12%; Cl, 5.25%.

(D) *2-isopropyl-3-(3.5-diiodo-4-β-N-diethylaminoethoxy-benzoyl) benzofuran and its hydrochloride*

The corresponding β-diethylaminoethoxy derivative was obtained from 2-isopropyl-3-(3.5-diiodo-4-hydroxy-benzoyl) benzofuran; the hydrochloride if the substance obtained melted at 172° C. after recrystallization from a mixture of acetone and ethyl acetate.

$C_{24}H_{28}O_3I_2NCl$ calculated: C, 43.2%; H, 4.22%; N, 2.10%; Cl, 5.32%. Found: C, 43.27%; H, 4.55%; N, 2.07%; Cl, 5.45%.

(E) *2-methyl-3-(3.5-diiodo-4-β-N-diethylaminoethoxy-benzoyl) benzofuran and its hydrochloride*

The corresponding β-diethylaminoethoxy derivative was obtained from 2-methyl-3-(3.5-diiodo-4-hydroxy-benzoyl) benzofuran; the hydrochloride of the substance obtained melted at 153° C. after recrystallization from acetone.

$C_{22}H_{24}O_3I_2NCl$ calculated: C, 41.30%; H, 3.63%; N, 2.19%; Cl, 5.56%. Found: C, 41.55%; H, 4.08%; N, 2.40%; Cl, 5.49%.

(F) *2-neopentyl-3-(3.5-diiodo-4-β-N-diethylaminoethoxy-benzoyl) benzofuran and its hydrochloride*

The corresponding β-diethylaminoethoxy derivative was obtained from 2-neopentyl-3-(3.5-diiodo-4-hydroxy-benzoyl) benzofuran; the hydrochloride of the substance obtained melted at 169° C. after recrystallization from a methanol-acetone mixture.

$C_{26}H_{32}O_3I_2NCl$ calculated: C, 44.88%; H, 4.61%; N, 2.01%; Cl, 5.09%. Found: C, 44.92%; H, 4.88%; N, 2.05%; Cl, 4.95%.

(G) *2-neohexyl-3-(3.5-diiodo-4-β-N-diethylaminoethoxy-benzoyl) benzofuran and its hydrochloride*

The corresponding β-diethylaminoethoxy derivative was obtained from 2-neohexyl-3-(3.5-diiodo-4-hydroxy-benzoyl) benzofuran; the hydrochloride of the substance obtained melted at 150° C. after recrystallization from a mixture of acetone and ethyl acetate.

$C_{27}H_{34}O_3I_2NCl$ calculated: C, 45.68%; H, 4.83%; N, 1.98%; Cl, 5.00%. Found: C, 45.86%; H, 4.75%; N, 2.19%; Cl, 4.82%.

(H) *2-n-pentyl-3-(3.5-diiodo-4-β-N-diethylaminoethoxy-benzoyl) benzofuran and its hydrochloride*

The corresponding β-diethylaminoethoxy derivative was obtained from 2-n-pentyl-3-(3.5-diiodo-4-hydroxy-benzoyl) benzofuran; the hydrochloride of the substance obtained after crystallization from ethyl acetate melted at 155° C.

$C_{26}H_{32}O_3I_2NCl$ calculated: C, 44.80%; H, 4.64%; N, 2.04%; Cl, 5.10%. Found: C, 44.93%; H, 4.99%; N, 2.04%; Cl, 5.07%.

(I) *2-ethyl-3-(3.5-dibromo-4-β-N-diethylaminoethoxy-benzoyl) benzofuran and its hydrochloride*

The corresponding β-diethylaminoethoxy derivative was obtained from 2-ethyl-3-(3.5-dibromo-4-hydroxy-benzoyl) benzofuran; the hydrochloride of the substance obtained after crystallization from a mixture of ethyl acetate and ether melted at 150° C.

$C_{23}H_{26}O_3Br_2NCl$ calculated: C, 49.36%; H, 4.68%; Cl, 6.34%; N, 2.51%. Found: C, 49.56%; H, 4.92%; Cl, 6.35%; N, 2.57%.

EXAMPLE III (A) *2-ethyl-3-(3.5-diiodo-4-β-N-piperidinoethoxy-benzoyl) benzofuran and its hydrochloride*

By means of the process as shown in Example IIA, but taking as a starting point 2-ethyl-3-(3.5-diiodo-4-hydroxy-benzoyl) benzofuran and using β-chloro-N-piperidino-ethane, 2-ethyl-3-(3.5-diiodo-4-β-N-piperidinoethoxy-benzoyl) benzofuran was obtained, the hydrochloride of which melted at 172° C.–173° C. after crystallization from a mixture of acetone and ethyl acetate.

$C_{24}H_{26}O_3I_2NCl$ calculated: C, 43.30%; H, 3.94%; N, 1.96%; Cl, 5.33%. Found: C, 43.60%; H, 4.20%; N, 1.92%; Cl, 5.43%.

(B) *2-ethyl-3-[3.5-diiodo-4-β-N-(di-n-propylamino)-ethoxy-benzoyl] benzofuran and its hydrochloride*

Starting from the same benzofuran as employed in Example IIIA and by using β-chloro-N-(di-n-propylamino)-ethane, 2-ethyl-3-[3.5-diiodo-4-β-n-(di-n-propylamino)-ethoxy-benzoyl] benzofuran was obtained, the hydrochloride of which melted at 170° C. after crystallization from a mixture of methanol and methyl ethylketone.

$C_{25}H_{30}O_3I_2NCl$ calculated: C, 44.02%; H, 4.40%; N, 2.05%; Cl 5.20%. Found: C, 44.10%; H, 4.54%; N, 2.09%; Cl, 5.22%.

(C) *2-ethyl-3-[3.5-diiodo-4-(α-methyl-β-N-piperidino-ethoxy)-benzoyl] benzofuran and its hydrochloride*

Starting from the same benzofuran as in Example IIIA and by using β-bromo-N-piperidinopropane, 2-ethyl-3-[3.5-diiodo-4-(α-methyl-β-N-piperidinoethoxy) - benzoyl] benzofuran was obtained, the hydrochloride of which melted at 176° C. after crystallization from acetone.

$C_{25}H_{28}O_3I_2NCl$ calculated: C, 44.20%; H, 4.20%; N, 2.06%; Cl, 5.22%; I, 37.3%. Found: C, 44.42%; H, 4.70%; N, 2.08%; Cl, 5.30%; I, 36.75%.

(D) *2-ethyl-3-(3.5-diiodo-4-β-dimethylaminoethoxy-benzoyl) benzofuran and its hydrochloride*

Starting from the same benzofuran as in Example IIIA and by using β-chloro-N-dimethylaminoethane, 2-ethyl-3-(3.5-diiodo-4-β-dimethylaminoethoxy-benzoyl) benzofuran was obtained, the hydrochloride of which melted at 170° C. after recrystallization from a mixture of acetone and ethyl acetate.

$C_{21}H_{22}O_3I_2NCl$ calculated: C, 40.31%; H, 3.54%; Cl, 5.67%. Found: C, 40.20%; H, 3.85%; Cl, 5.63%.

(E) *2-ethyl-3-[3.5-diiodo-4-(α-methyl-β-N-dimethylami-noethoxy)-benzoyl] benzofuran and its hydrochloride*

Starting from the same benzofuran as in Example IIIA and by using β-chloro-N-dimethylaminopropane, 2-ethyl-3 - [3.5 - diiodo - 4 - (α - methyl - β - N - dimethylamino-ethoxy)-benzoyl] benzofuran was obtained, the hydrochloride of which melted at 178° C. after recrystallization from a mixer of methanol and acetone.

$C_{22}H_{24}O_3I_2NCl$ calculated: C, 41.3%; H, 3.78%; N, 2.14%; Cl, 5.54%. Found: C, 41.8%; H, 3.95%; N, 2.22%; Cl, 5.55%.

(F) *2-ethyl-3-(3.5-diiodo-4-β-N-pyrrolidinoethoxy-benzoyl) benzofuran and its hydrochloride*

When the starting material was the same benzofuran as in Example IIIA and when β-bromo-N-pyrrolidinoeth-ane was used, 2-ethyl-3-(3.5-diiodo-4-β-N-pyrrolidinoeth-oxy-benzoyl) benzofuran was obtained, the hydrochloride of which melted at 189° C. after recrystallization from a methanol-acetone mixture.

$C_{23}H_{24}O_3I_2NCl$ calculated: C, 42.40%; H, 3.72%; I, 38.9%; N, 2.15%; Cl, 5.45%. Found: C, 42.40%; H, 3.98%; I, 38.3%; N, 2.20%; Cl. 5.31%.

What is claimed is:

1. A compound of the class consisting of a free base and the pharmaceutically acceptable acid addition salts thereof, the free base being represented by the formula:

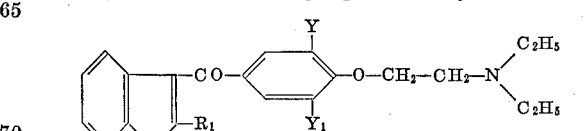

in which $R_1$ is an alkyl group containing 1 to 6 carbon atoms and Y and $Y_1$, which are identical, are selected from the group consisting of hydrogen, iodine and bromine.

2. 2-n-butyl-3-(3.5-diiodo-4-β-N-diethylaminoethoxy-benzoyl) benzofuran.

3. A pharmaceutically acceptable acid addition salt of 2-n-butyl-3-(3.5-diiodo-4-β-N-diethylaminoethoxy-benzoyl) benzofuran.

4. 2-isopropyl-3-(3.5-diiodo-4-β-N-diethylaminoethoxy-benzoyl) benzofuran.

5. A pharmaceutically acceptable acid addition salt of 2-isopropyl-3-(3.5-diiodo-4-β-N-diethylaminoethoxy-benzoyl) benzofuran.

6. 2-neopentyl-3-(3.5-diiodo-4-β-N-diethylaminoethoxy-benzoyl) benzofuran.

7. A pharmaceutically acceptable acid addition salt of 2-neopentyl-3-(3.5-diiodo-4-β-N-diethylaminoethoxy-benzoyl) benzofuran.

8. 2-neohexyl-3-(4-β-N-diethylaminoethoxy-benzoyl) benzofuran.

9. A pharmaceutically acceptable acid addition salt of 2-neohexyl-3-(4-β-N-diethylaminoethoxy-benzoyl) benzofuran.

10. 2-n-butyl-3-(4-β-N-diethylaminoethoxy-benzoyl) benzofuran.

11. A pharmaceutically acceptable acid addition salt of 2-n-butyl-3-(4-β-N-diethylaminoethoxy-benzoyl) benzofuran.

No references cited.

HENRY R. JILES, *Acting Primary Examiner.*
IRVING MARCUS, *Examiner.*